United States Patent

Yates et al.

[11] Patent Number: 5,011,222
[45] Date of Patent: Apr. 30, 1991

[54] ORTHOTIC CYCLE SADDLE

[76] Inventors: Paul M. Yates, 1922 Waltonia Dr., Montrose, Calif. 91020; George R. Yates, 17591 Collins La., Huntington Beach, Calif. 92647; George Yates, Jr., 151 Cumberland Rd., Glendale, Calif. 91202

[21] Appl. No.: 378,018
[22] Filed: Jul. 11, 1989
[51] Int. Cl.⁵ .............................................. B62J 1/00
[52] U.S. Cl. .................................... 297/195; 297/214
[58] Field of Search ............... 297/195, 214, 458, 459, 297/207

[56] References Cited

U.S. PATENT DOCUMENTS

| | | |
|---|---|---|
| D. 25,030 | 12/1895 | Young . |
| D. 27,956 | 12/1897 | Serson . |
| D. 29,719 | 11/1898 | Leech . |
| D. 287,317 | 12/1986 | Allen et al. . |
| D. 293,394 | 12/1987 | Holcomb . |
| 556,250 | 3/1896 | Brown . |
| 574,503 | 1/1897 | Meter . |
| 576,310 | 2/1897 | Henderson . |
| 615,077 | 11/1898 | Lovekin . |
| 638,861 | 12/1899 | Bean . |
| 1,462,976 | 7/1923 | Mesinger . |
| 1,858,477 | 5/1932 | Blake . |
| 2,568,796 | 9/1951 | Dunlap . |
| 3,269,773 | 8/1966 | O'Connor . |
| 3,476,496 | 11/1969 | Golden . |
| 3,740,096 | 6/1973 | Bridger ............................. 297/459 |
| 3,844,611 | 10/1974 | Young . |
| 4,098,537 | 7/1978 | Jacobs ................................. 297/195 |
| 4,141,587 | 2/1979 | Holcomb . |
| 4,218,090 | 8/1980 | Hoffacker et al. . |
| 4,462,634 | 7/1984 | Hanagan . |
| 4,502,727 | 3/1985 | Holcomb et al. . |

FOREIGN PATENT DOCUMENTS 9057 of 1895 United Kingdom ................ 297/195
13218 of 1898 United Kingdom ................ 297/195

Primary Examiner—Peter R. Brown
Attorney, Agent, or Firm—Walter A. Hackler

[57] ABSTRACT

An anatomically conforming cycle saddle having a compound surface including an elongated horn section transitioning rearwardly into a laterally flared, raised cantle. A perineum/genital groove is symmetrically disposed along the longitudinal axis of the generally horizontally upper horn surface as seen in plan view. The cantle, having an angle of inclination in the range of 35°-55°, preferably 45°, includes a pair of opposed, bilaterally symmetrical, inclined dished surfaces, and has a generally triangular, bilaterally symmetrical, raised, inclined coccyx support member disposed centrally and rearwardly therebetween. The concavity of the dished surfaces begin in the forward-most horizontal part of the cantle and extend deeply in the central portion of the cantle, inclining to vertical at the rearward cantle lip. The upper surface of the coccyx support member is inclined at an angle of about 30° to the horizontal, and transitions smoothly with the cantle lip and adjacent steeply inclined inside areas of the dished surfaces at its rearward, widely flared, elevated end and with the pelvic arch ridge at its forward, narrow, lower end. The pelvic arch ridge then transitions smoothly into the generally horizontal upper horn surface. In the preferred best mode, the coccyx supprt member is defined by a slightly concave-up top surface and steep, rearwardly and outwardly flared side surfaces. All of the defined zones are smoothly flared into each other via intermediate transition zones.

11 Claims, 4 Drawing Sheets

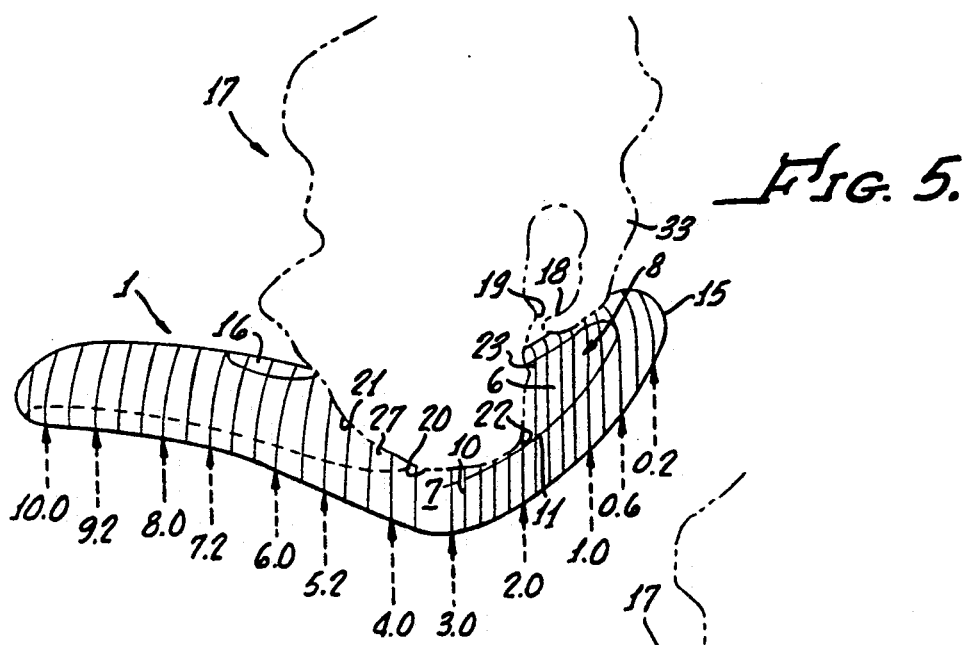
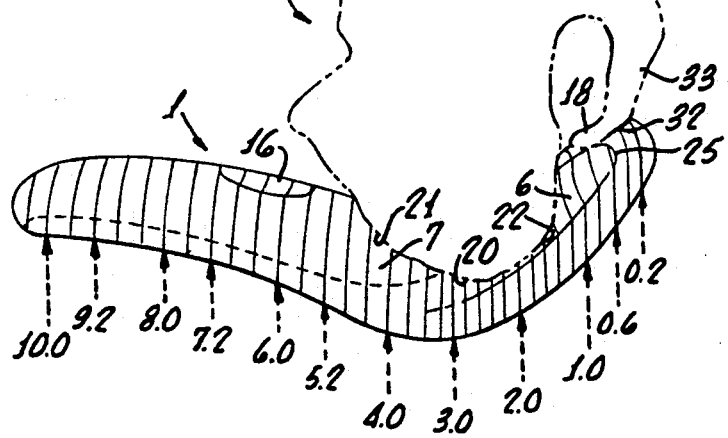
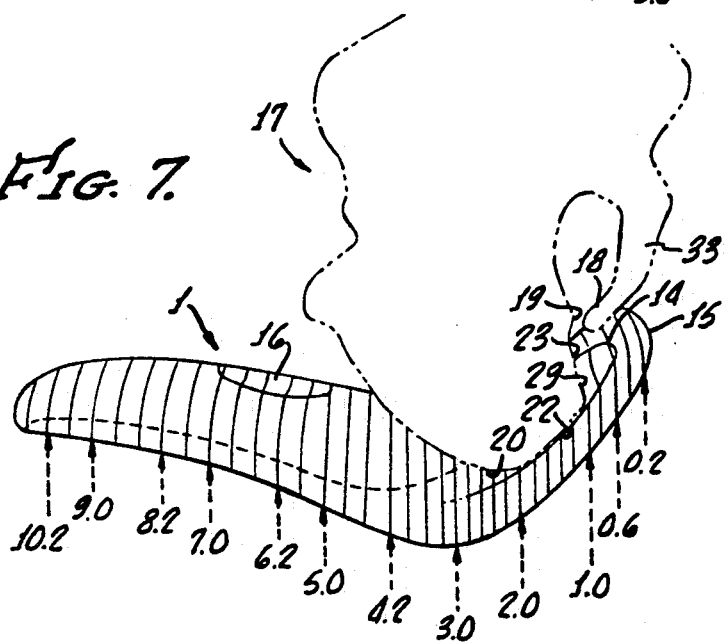

ORTHOTIC CYCLE SADDLE

FIELD

This invention relates to new and improved saddles for cycles, the contours of which (particularly the horn and cantle) are specially adapted to conformingly support the sacral, coccal, ischial and perineal/genital regions of the rider in order to improve rider comfort, and permit improvements in a cyclist's pedaling efficiency and power output while remaining seated. More particularly the invention relates to a new anatomic bicycle seat design that incorporates various unique anatomically conforming and fully supporting portions in the aft (cantle) and forward (horn) portions of the saddle shell.

BACKGROUND

The basic design of a bicycle saddle, much like the basic design of the bicycle, has not changed significantly in over 100 years. The shape of modern performance oriented bicycle saddles is generally horizontal in profile with a narrow front end portion (the horn or pommel) and a wider, flared tail portion with a concave intermediate portion for thigh clearance.

The materials of construction of early saddles were generally limited to solid or perforated wood, cane, or like rigid materials. The design of later saddles included cushion covers incorporated with a wood or metal framework. Some modern saddles still employ materials that were common in the early history of cycling, such as the semi-rigid, all-leather, shell-type saddle, but the majority of today's saddles take advantage of the great advances in materials technology.

Most modern high performance saddles consist of a pliable or semi-rigid molded plastic or nylon shell over which conforming padding material is placed, and finally a leather, plastic or vinyl cover is fitted. The use of these materials in modern saddles has resulted in a lighter, more durable and more appealing saddle than those of even ten years ago, but the seat contours remain substantially the same.

One of the major design considerations of cycle saddles is comfort. One approach to providing comfort for the cyclist is by conforming the saddle to the cyclist's posterior. U.S. Pat. Des. No. 25,030 (Young, 1895) discloses a conventional horizontal saddle design wherein conformation is achieved by the removal of material. Concavities are preformed into the horizontal saddle surface corresponding to the pelvic bone and perineum regions of the cyclist. Concave regions along the sides of the saddle are further disclosed to assist in the freedom of movement of the cyclist's inner thighs when pedaling. U.S. Pat. No. 1,858,477 (Blake, 1932) teaches having a channel shaped cavity suitably located in the saddle to normally receive and partly contain the privates of a male rider and partly receive the privates of a female rider.

In both these U.S. Pat. Nos. 25,030 and 1,858,477, support for the sacrum, coccyx and other rear pelvic projections was not considered. Areas of contact are the ischial tuberosities (bottom part of the pelvic bone), and the genital and perineal regions. The genital channels were required to be deep in order to reduce the downward pressure exerted on this area by the rider's weight. However, such exaggerated grooves or channels become excruciatingly uncomfortable, especially during vigorous pedaling, since they require the rider to carefully align his or her privates with the genital groove. This becomes increasingly difficult when the rider must repetitively "get out of" the saddle in order to stretch his or her legs or to move his position frequently to use different muscles to accommodate continuously changing terrain.

Another way to conform a saddle is by adding a cushioning material to the saddle surface. U.S. Pat. No. 576,310 (Henderson, 1897) discloses a bicycle cushion design wherein a cloth cover or like material is selectively stuffed with a flexible and resisting material to form soft cushion lobes. The cover is then stretched over a wood or similarly rigid horizontal saddle base resulting in a cushioned saddle with strategically placed ridges said to support the pelvic bones of the cyclist. In U.S. Pat. No. 3,844,611 (Young, 1974), two layers of high low density resilient foam padding material are placed on a horizontal saddle base having two horizontally and rearwardly disposed concavities and a forwardly disposed concavity suitably placed for the seated rider's privates. These concavities are "hollowed" down into a horizontal saddle base below the said "shelf" portion in such a manner as to support the ischial tuberosities of the pelvis while leaving the rear ischium, coccyx and sacrum unsupported. The pressure on the ischial tuberosities and the genitals is said to be greatly diminished by the shock-absorbing qualities of the padding.

For a long time the best saddles employed a fine grade semirigid leather material as a saddle base. Indeed, many still argue that a leather saddle, once broken-in, is the height of comfort. This idea began to change when pliable nylon-based shells were introduced. Pliable shells, as the name implies, generally comprise a pliable plastic base, onto which molded foam is added and then covered with a vinyl, leather, or plastic covering. In the mid-70's the so-called "anatomic" saddle became popular. These anatomic saddles combine a more subtly designed pliable nylon base shell upon which padding materials are placed. Early anatomic saddle designs were unduly flexible thereby causing fatigue and discomfort to the rider. U.S. Pat. No. 4,098,537 (Jacobs, 1978) discloses an improved bicycle saddle incorporating a longitudinal tension rib for increasing the longitudinal stiffness of the saddle and a transverse rib extending across the saddle at the central transition portion to impart flexural stiffness to the saddle.

Despite the improvements made to enhance the comfort and stiffness of the anatomic saddle, the support of the pelvic region in these saddles was still incomplete. Only the bone structure in the immediate area of the ischial tuberosities is anatomically supported leaving the coccyx, sacrum and the steeply rising rear ischial regions (including associated tissues, and musculature) unsupported.

The recent trend in saddle design is to find the right amount of padding necessary to provide adequate comfort to the rider while still conforming to the saddle shell. Too little padding conforms to the semi-anatomic shape of the saddle nicely, but padding (especially foam) gives out at the point of most pressure and therefore bottoms out at the most painful areas directly beneath the pelvic bones. To address the point pressure problem inherent with foam padded saddles, manufacturers have introduced viscoelastic polymer (VEP) padding to replace the foam padding on today's state of the art saddles. The VEP saddles employ a gellike polymer to displace point loads under the ischial tuberosities. This VEP type padding creates a "water bed" type of pressure displacement by immersing the buttocks area in a semiliquid type padding. This "water bed" type of pressure displacement may spread out the point load pressure upon the ischial tuberosities, but because it is a moveable fluid it still cannot firmly grip the pelvis, thus undue movement of the pelvis occurs during a pedaling motion. Hence, there is a loss of energy transmitted to the pedals when the pelvis is left unsupported or not firmly supported, and stability is decreased through undue movement of the buttocks on the saddle surface.

Thus, the problem with today's more heavily padded, semianatomic saddles is that discomfort is caused to the cyclist from excessive pelvic float or movement on the seat surface. This excessive movement or grinding of the pelvic areas can cause bruising, groin pain, numbness, urethritis, neuritis, saddle sores and chafing. These ailments are aggravated by friction and any undue pressure that is caused to be exerted on the blood vessels and nerves along the inner and underside of the rider's pelvic region. This is to be contrasted with the present invention which requires no break in period to obtain full, initial anatomic conformity. in accordance with the present invention, point loads are fully displaced and excessive friction causing movement upon the saddle is eliminated.

It is known in the art that power transmission can be enhanced by constraining the movement of the rider's pelvis on the saddle. U.S. Pat. No. 638,861 (Bean, 1899) discloses a bicycle harness designed to provide an abutment for a point of resistance more or less directly above the pedals, which enables a rider to greatly augment the power of his downward thrust upon the pedals. More recently, a device called the "tether", a wire sling leading from the handlebar rearward around the waist of the cyclist has been used by professional racing cyclists. In addition to providing a point of resistance for allowing the rider to maximize his thrust potential against the pedals while seated, valuable energy is conserved since the rider is relieved of using his or her own arm muscles to provide this resistance. The tether also encourages a round spin whereby full use of the quadriceps muscles imparts a driving force on the pedals at substantially every degree of crank arm rotation. Furthermore, the tether encourages the cyclist to assume a relatively more aerodynamic posture, reducing the frontal area of the rider/machine combination. A reduction in frontal area means less wind resistance to the cyclist, permitting him or her in sustaining a higher average speed for a longer period of time.

However, the tether is not without its serious disadvantages. The tether can be dangerous when riding in crowded situations where mishaps are likely to occur, as is likely in an organized recreational ride, training ride, or race. Tethers are dangerous because they have no quick release mechanism to prevent a rider from becoming entangled with his or her bike during a crash. Consequently, the use of a tether has been banned in all types of mass start racing in the United States and all other countries subject to UCI (Union Cyclist International) rules, which includes any country that sanctions amateur or professional bicycle racing. In comparison, my new SCI shell design provides the increased aerodynamic and thrust advantages of tethers without the dangers through full anatomic conformity to the rear pelvis and buttock regions.

The prior art is replete with cycle saddles having raised cantles or back rests acting as either thrust plates or back supports for the rider. U.S. Pat. No. 4,141,587 (Holcomb, 1979) and U.S. Pat. No. 4,502,727 (Holcomb, et al., 1985) disclose saddles having a flat base with a rearwardly disposed back rest curving upwardly approximately 90° from the base. The major function of the back rest in these references is to provide comfort for casual riding. Neither saddle is particularly contoured to support the rider's pelvis other than cut-outs for leg clearance and the back rest. Comfort is achieved by supplying a generous layer of sponge padding material to the flat surface and back rest. U.S. Pat. No. D-293,394 (Holcomb, 1987) discloses a flat saddle having cut-outs for leg clearance and a rearwardly disposed right-angled cantle. As seen from an end view, the cantle is semicircular, and extends upward a distance equal to approximately ⅓ the saddle's longitudinal dimension. As in the two immediately preceding references, comfort is achieved by a generous layer of sponge-like foam padding material of substantially uniform thickness. Other examples of cycle saddles having rearwardly disposed, curved upward cantles or backrests include U.S. Pat. No. 615,077 (Lovekin, 1898); U.S. Pat. No. D-287-317 (Allen et al., 1986); U.S. Pat. No. D-29-719 (Leech, 1898); and U.S. Pat. No. D-27,956 (Serson, 1897). The cantle portions of these saddles are highly exaggerated and curve upward from the horizontal saddle base anywhere from 45°-90°. Leech and Serson further disclose totally relieved portions in the saddle for the private parts of the rider.

U.S. Pat. No. 556,250 (Brown, 1896) discloses a cycle saddle having a totally relieved central area and a raised cantle. The cantle is shallow and therefore provides little or no thrust capability. Thus, in each of the previously mentioned patents containing a raised cantle or backrest, there is no specific, bilateral anatomic support of the steeply rising rear pelvic areas, namely the rise to near vertical of the bone structure of the right and left rear ischial bones combined with their corresponding musculature and tissue as is provided by the present invention. Prior art raised cantle saddle designs do not contain a wedge-like coccyx support located in the upper cantle regions. It must be noted herein, that when reference is made to the term "coccyx support" or "coccyx tongue" in this application, these terms not only refer to the relief and support of the coccyx but also refer to the anatomic benefits derived from the placement of a support projection (containing wedge-like, rearwardly flaring side surfaces) in the upper medial area of the raised cantle of the present invention. In accordance with the present invention, the flared lateral surfaces of this wedge-like projection correspondingly fit between the rider's buttocks (directly below and forward of the coccyx) to provide a unique anatomic barrier to the rearward movement of the buttocks on the saddle when pedaling, thereby providing additional surface area for the comfortable displacement of the rider's weight on the saddle by uniquely supporting areas of the buttocks not considered by previous saddle designs.

U.S. Pat. No. 1,462,976 (Mesinger, 1923) and U.S. Pat. No. 3,269,773 (O'Connor, 1966) disclose saddles having backrests for use on motorcycles. In Mesinger, the back rest is detachable, whereas in O'Connor the back rest is sufficiently low enough to permit a second passenger seat to be fitted in tandem with the first, forward drive seat. Both motorcycle seats employ the back rest as a means for overcoming the inertia of the riders in the starting and acceleration of the motorcycle. U.S. Pat. No. 2,568,796 (Dunlap, 1951) and U.S. Pat. No. 4,462,634 (Hanagan, 1984) also disclose motorcycle saddles with slightly raised cantles. However, as was previously mentioned, the saddles intended for motorsport use are concerned primarily with the inertia of the rider and passenger due to acceleration, thus saddle comfort on these saddles is due to generous padding with little or no regard for close and firm sacral, coccal, or ischial support.

U.S. Pat. No. 574,503 (Van Meter, 1897) discloses a cycle saddle having two rearwardly disposed, bilaterally symmetrical concavities for receiving the tuberischia, a centrally disposed groove for the perineum region, and a raised cantle. The rearward concavities are also padded by means of air sacks disposed between the metal frame of the saddle and the saddle cover. The perineum groove is overly deep and long, extending needlessly far into the cantle to provide any support. The raised cantle merely slopes gently upward and lacks any concavities or special wedge-like projections to provide close anatomic support for rearwardly disposed bones of the pelvis or for the unique support of the area between the buttocks located directly below and forward of the coccyx. The shallow inclination also tends to permit the rider to slide off the back of the saddle rather than provide a thrust plate for the rider.

It must be noted that the rearwardly disposed concavities of U.S. Pat. No. 574,503 lie only in the horizontal plane of the horn surface and are designed solely for the ischial tuberosities to sit "upon". This is contrasted to he present invention in which the steeply rising rear ischium and its projections slide rearwardly "into" a pair of raised, bilateral concavities. The rise in the surfaces of these concavities correspondingly matches the rise to near vertical of the right and left rear ischium when seated.

In studying prior art saddle configurations containing raised cantles, it is important to recognize that these designs ignore the more subtle differences in the anatomic detail of the rear pelvis. These prior art, raised cantle saddle designs cannot closely follow the rise to near vertical of the right and left rear ischium, since (as seen in the study of rear pelvic anatomy) to do so would mean that the cantle (of prior art designs) would rise directly into the coccyx. Therefore, unless the cantle's anatomic support of the near vertical portions of the rear ischium and its projections is combined with the relief and support of the coccyx (as contained in the present invention), an uncomfortable condition will occur in which the coccyx interferes with the said near vertical rise of the cantle's rear ischial support. Thus, the prior art, semi-anatomic designs have avoided this problem by reducing the rate of incline of their cantle surfaces in the area of the rear ischium, so that the coccyx is not particularly supported and support of the near vertical rise of the rear ischium can not be achieved. By placing a medially located, wedge-like coccyx support area in the upper, aft end of the SCI's raised cantle, the near vertical support of the corresponding rear ischium can be achieved while displacing more of the rider's weight over an increased surface area of the pelvis and buttocks.

Additionally, as will be noted later in the detailed description, the uppermost regions of the rearwardly disposed concavities of the present invention can be extended upwardly to support even more of the right and left rear ischium, while leaving the coccyx support at the same height as disclosed in the preferred embodiment. Thus, the rear uppermost portions of the concavities would rise in relation to the coccyx support area (which separately conforms to the coccyx and the area between the buttocks located directly below and forward of the coccyx of the pelvis). The rise in height of these concavities would be determined by the amount of thrust improvement desired combined with aesthetic considerations.

Another problem with current saddle design is that the lack of close rearward pelvic support combined with the wedge-like features of the coccyx support causes the top of the pelvis (or crests of the ilium) to rotate rearwardly while the ischial tuberosities stay in a relatively stationary position on the seat. Thus, when riding for long periods of time with the lower spine assuming an arched or hunched forward position, lower back pain is experienced. This constant bending of the lower vertebrae causes stress on the muscles and nerves of the lower back.

Accordingly, there is a need in the art for an improved cycle saddle that is specially contoured to semi-rigidly and fully support the coccyx (and thus the adjacent sacrum) and the steeply rising rear ischium, while providing a relieved area for the perineum/genital regions. This includes the support of the corresponding tissues and musculature surrounding these aforementioned pelvic areas (including the area between the buttocks located directly below and forward of the coccyx). There is also need for a saddle that conformingly fits a rider's pelvis and buttocks like a glove so that: (a) point loads between the bony projections of the rider's pelvic region and the saddle are evenly distributed; (b) lower back pain and muscle tension is reduced; (c) common ailments related to excessive pelvic float are substantially eliminated; (d) saddle sores, chafing, numbness, neuritis, bruising and the like are reduced or eliminated; and (e) power thrust to the pedals is enhanced while maintaining a more aerodynamic and energy conserving riding position.

Accordingly, it is an object of this invention to provide a lightweight orthotic cycle saddle having improved performance, support and comfort characteristics.

It is another object of this invention to provide a cycle saddle specially contoured to support up to 50% more of the bone, muscle and tissue structure of the pelvis and buttocks over conventional saddle designs.

It is another object of this invention to provide an improved cycle saddle specially contoured to unweight sensitive genital areas of both male and female cyclists.

It is another object of this invention to provide an improved cycle saddle specially contoured to distribute the rider's weight evenly over a larger surface of the saddle thereby eliminating point loads between the rider's pelvic bones and the hard contact area of the saddle.

It is another object of this invention to provide a raised wedge-like coccyx support projection having downwardly sloping and rearwardly flaring lateral surfaces, creating a wedge-like barrier in the aft, upper portion of the saddle's raised cantle, thereby preventing unwanted rearward movement of the buttocks while pedaling.

It is another object of the invention to provide an improved cycle saddle specially contoured to redistribute pressure which is normally on the anterior portions of the ischial tuberosities and upon anterior portions of the pelvis and pelvic arch in conventional saddles, to the steeply rising posterior sections of the pelvis including the rear ischium, sciatic notch area, ischial spines, coccyx and sacrum.

It is another object to provide a cycle saddle with an inclined, anatomic, bilaterally, flared cantle containing a pair of rearwardly disposed, inclined (rising to nearly vertical) concavities that form a power-improving thrust plate into which the corresponding bones of the rear ischium (which also rise to a near vertical attitude) slide rearwardly into.

Still other objects of the invention will be evident from the specification and drawing, including the detailed description.

SUMMARY OF THE INVENTION

A new, more completely and anatomically conforming bicycle seat provides various unique anatomic conforming features fully supporting the sacrum, coccyx and complete ischium (SCI) of the rider and generally includes a shell having a single, compound upper seating surface, said seating surface including a forwardly disposed horn member having a generally horizontal upper surface and a rearwardly disposed laterally flaring cantle thrust plate member, the cantle thrust plate member including means, defining a pair of bilateral concavities matching the near vertical portion of the right and left ischium of a rider when seated upon said shell, for providing bilateral anatomic support for the near vertical portion of the right and left ischium including corresponding musculature and tissue and means for securing said shell to a cycle saddle post. Accordingly, a saddle in accordance with the present invention is referred to as a SCI-type saddle.

More particularly, the concavities in accordance with the present invention commence at forward margins in the cantle where the ischial tuberosities of the pelvis contact the saddle shell surface, and then rearwardly and upwardly incline rapidly until the incline approaches a vertical attitude in relation to the normal, generally horizontal plane of the seat. This rise of the rearwardly disposed concavities to an approximately vertical attitude corresponds to the upwardly sloping rise of the rear ischium to a near vertical attitude when the rider maintains a seated position. The outer margins of the concavity portions flare outwardly and rearwardly to the widest point of the cantle, and then taper back inwardly toward a medial line of the seat. Also the inclined concavities, which begin in the frontal cantle area, increase in depth toward the middle of the raised cantle, and then decrease in concavity and taper again at the aftermost portion of the seat to form a ridge. As previously mentioned, when the rise to near vertical of the right and left rear ischium is closely supported (as is the case with the raised, rear cantle of the present invention), a centrally located coccyx support is necessary to relieve and support the coccyx (including the support of the area between the buttocks located directly below and forward of the coccyx), so that the cantle does not rise directly into and uncomfortably intersect the coccyx. This raised, wedge-like adaptation for the anatomy in the area of the coccyx bilaterally separates the raised cantle of the present invention and allows the rearwardly disposed areas of the pelvis and buttocks to be more closely griped than prior art saddles. As has been noted previously and also in the detailed descriptions, the rear uppermost regions of the SCI saddle rearwardly disposed concavities may be extended upwardly and thus farther above the coccyx support than described in the preferred embodiment. This would allow for the support of even more of the near vertical rise of the right and left rear ischium for even greater thrust support.

These outlined margins and the depth of these concavities can vary within the scope of this invention depending upon the use, performance, and comfort requirements of particular bicycle types. For example, an embodiment having greater flare at the previously mentioned points may be used on a mountain bike, woman's bike, or "beach cruiser" type bicycle, whereas a solely racing version would tend to have less lateral flare.

Therefore, in addition to the anatomically conforming concavities, a sacral-coccyx wedge-like support area is provided lying medially of, and in an elevated, adjacent position to the upper half of the concavities. A perineal/genital pressure-relief groove is provided along the center line of the saddle in the portion of the horn forward of where it merges with the cantle to provide pressure relief to the private parts of both male and female cyclists.

The SCI-type saddle of the present invention comprises a unique combination of compound, continuous contiguous surfaces (concavities and built up areas) that provide full anatomical support and accommodation for areas of the pelvis (including the surrounding tissues and musculature) not heretofore supported by prior art seat designs, namely, the complete bone structure forming the pubic arch, the sacrum, coccyx, complete ischium from the ischial tuberosities rearward to the near vertical portions of the rear ischium.

The SCI saddle of this invention is able to support up to 50% more of the bone structure of the pelvis as compared to currently available conventional horizontal saddle designs, and at the same time remove pressure on sensitive perineal/genital areas of the male and female cyclist. This pressure reduction is also termed "unweighting". The SCI saddle also anatomically contacts up to 50% more of the muscle and tissue portions of the buttocks which surround there pelvic areas, depending on riding position. Whether riding in the flexed-forward standard "aerodynamic" cycling position (in which the back is inclined forwardly), or in an upright position, a superior distributive support of rider weight is achieved, reducing chafing, saddle sores and the like.

The SCI saddle of this invention does not rely on the very flexible nature of today's plastic (nylon) saddle, or the "forming" properties of a leather shell to conform to the ischial areas of the pelvis. Instead the SCI's inclined rear bilateral scooped-out portions (herein also termed "concavities" or "scooped surfaces"), and the raised coccyx support "tongue" positioned therebetween along the saddle midline, including the inclined rearwardly flaring wedge-like lateral surfaces of the coccyx support (both in the raised cantle), provide much greater and more even weight support employing a shape in which pressure upon anterior portions of the pelvis (the pubic arch) and pressure on anterior portions of the ischial tuberosities is anatomically redistributed rearwardly to posterior sections of the pelvis and buttocks, including the rear ischium, coccyx, and sacrum. The highly elevated, inclined cantle (having concavities that terminate nearly vertical) of the SCI saddle rises far above the normal horizontal surface plane of today's saddles to provide close anatomic support to heretofore unsupported rear sections of the pelvis so that a whole new dimension in load distribution is created. Therefore pressure upon the perineum/genital region is greatly diminished by the transfer of weight to the rear concavities and all the surfaces of the raised coccyx tongue in the cantle plate. As previously mentioned, when reference is made herein to the "coccyx support" or "coccyx tongue", these terms not only refer to the relief and support of the coccyx, but also refer to a wedge-like projection which uniquely fits and supports the rider's anatomy between the rider's buttocks (located directly below and forward of the coccyx), so that a unique comfortable support of the pelvis and buttocks is created which in turn provides a wedge-like barrier to rearward movement of the buttocks on the saddle when pedaling.

The preferred material for the SCI saddle is a semi-rigid grade of nylon, formed as a shell by conventional techniques. While other materials can be used for the construction of the SCI shell (such as fiberglass, other types of plastic, or metal), nylon is the presently-preferred material for durability and control of flexural properties. The slightly flexible properties of a nylon-type shell allows the SCI configuration to completely grip and support more ares of the pelvis and buttocks than ever before. This grip effect, combined with an almost vertical portion of the cantle concavities and wedge-lie surfaces of the coccyx support, provide a solid barrier to prevent the rear ischium from moving rearward, thus allowing the rider to remain seated in a more aerodynamic and energy conserving posture for longer periods of time, while permitting the rider to sustain higher average speeds.

Through the use of the SCI's more completely and anatomically conforming shape, the need for excessive amounts of padding (which also adds excess weight to the saddle) to disperse point loads is eliminated. Without the use of excess padding the SCI shell shape attains superior comfort and distribution of point loads while eliminating undue movement of the pelvis on the seat surface. Thus, frictional movement or grinding of pelvis areas which creates chafing, urethritis, saddle sores and numbness is eliminated while stability and energy transmitted to the pedals is increased. Therefore, the new SCI shell shape requires no initial break-in period through full, initial anatomic conformity while at the same time, there is comparatively little or no padding to break down or wear out.

The raised concavities and wedged coccyx support projection of the SCI saddle provide a push-plate (thrust surface) which permits the rider to exert more force on the cranks while remaining seated, and at the same time, relieves the forward pull tension necessary to resist the rearward slide of the pelvis experienced with conventional saddles. At the same time, as previously mentioned, these same SCI features prevent the over-rotation of the pelvis and vertebrae of the lower back, thereby reducing back pain.

BRIEF DESCRIPTION OF THE DRAWINGS

The invention is illustrated in the drawings in which horizontal contour lines (in inches) help show the compound surface configurations.

FIG. 5 is a perspective view of the saddle showing a rider's pelvis positioned thereon in a first, forward riding position;

FIG. 6 is the identical perspective view of FIG. 5 wherein the rider's pelvis has moved further back along the saddle during a second, mid-riding position;

FIG. 7 is the identical perspective view of FIG. 6 wherein the rider's pelvis has moved even further rearward along the saddle of the present invention showing the saddle's conforming support of the rearwardly disposed bones of the rider's pelvis during a third, maximum effort type of riding position;

DETAILED DESCRIPTION OF THE PREFERRED EMBODIMENT

Figure 1:
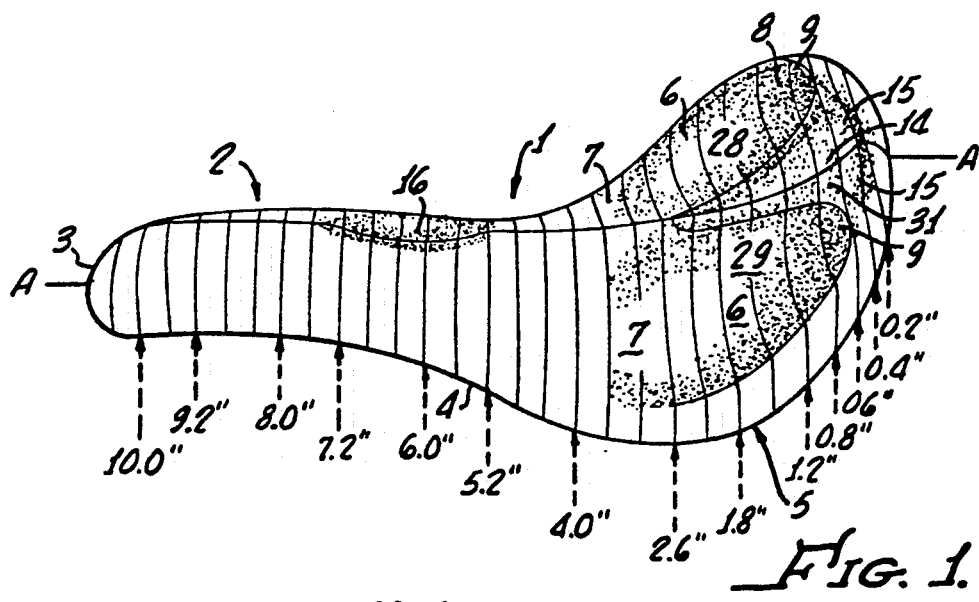
FIG. 1 is an elevated side perspective view of the specially contoured saddle of this invention with vertical contour lines showing the general relationship of the saddle's unique features along the longitudinal axis of the saddle.

The following detailed description illustrates the invention by way of example, not by way of limitation of the principles of the invention. This description will clearly enable one skilled in the art to make and use the invention, and describes several embodiments, adaptations, variations, alternatives and uses of the present invention.

FIGS. 1, 2, 4 and 8 are various perspective views of the specially contoured saddle of this invention employing spaced contour lines (in inch dimensional measurements) to help illustrate the combination of functional surfaces. Several of the contour lines numerically are position referenced relative to each other; see for example numbers 0.2" to 10.0" in FIG. 1 and 1.0" to 3.6" in FIG. 2, etc. The SCI saddle 1 includes an elongated horn 2 having a pommel 3 at one end and a pair of concave thigh surfaces 4 forming the transition of the horn 2 to the bilaterally flared rear cantle 5.

The saddle 1 is preferably fabricated out of injection molded polypropylene, polyurethane, ABS copolymer, nylon or other like material in a monocoque construction. The density and molecular weight is selected to be sufficiently high to provide a relatively rigid construction that, while permitting some flexing, should not be so flexible to promote fatigue, inefficiency or inadequate support.

The bilaterally flared rear cantle 5 is further defined by a pair of rearwardly disposed, inclined, scoop or dish-like concave surfaces 6. These surfaces are concave-up, and are symmetrical about and spaced laterally from the longitudinal axis A—A of the saddle 1. The upper edge 25 of the dish surfaces is spaced inwardly from the rear and top edge of the cantle 5 to provide a lip or ridge 15, which also functions as a transverse strengthening rib to reinforce the cantle at a principal point of functional stress.

Referring now to FIGS. 1-4, and 8, the dished surface concavities 6 begin aft of a transition zone 7 where the ischial tuberosities of the pelvis will be supported by the shell, and then incline rapidly upwardly and rearwardly to perimeter area 8 where the incline has reached an approximately vertical attitude, in comparison to the normal, generally horizontal plane of conventional saddles. This rise in the surface of the concavities to an approximately vertical attitude closely follows the rise to near vertical of the rear right and left ischium of the pelvis. The marginal edge 9 of the concavities 6 flares outwardly from an initial lower point 10 (which also marks the inflection point between the rearward end of the curved thigh surface 4 (FIG. 3) and the outermost (medial) point 11 of the concavities 6). After which the marginal edge 9 curves inward to the uppermost point 25 of the concavities 6. It is at this point that marginal edge 9 merges with the upper-outer edge 28 of a coccyx support 14 whose forward terminal point 12 is shown. The respective forward terminal points 12 of the coccyx support 14 are spaced laterally from the medial axis A—A of the saddle, and an upper coccyx surface 31 of the wedge-like coccyx support 14 commences therebetween.

Also, it should be noted that the upper-outer edges 28 of the coccyx support 14 lie in an elevated position relative to the general location of the concavities 6, thereby forming the raised, flared and wedge-like side surfaces 29 of the coccyx support 14. Combining the upper coccyx support surface 31 with the side surfaces 29, a raised, wedge-like support surface is created in the upper half of the raised cantle 5. Thus, a specific support is created for the coccyx 18 and surrounding tissues and musculature between the buttocks (located directly below and forward of the coccyx 18).

Figure 10:
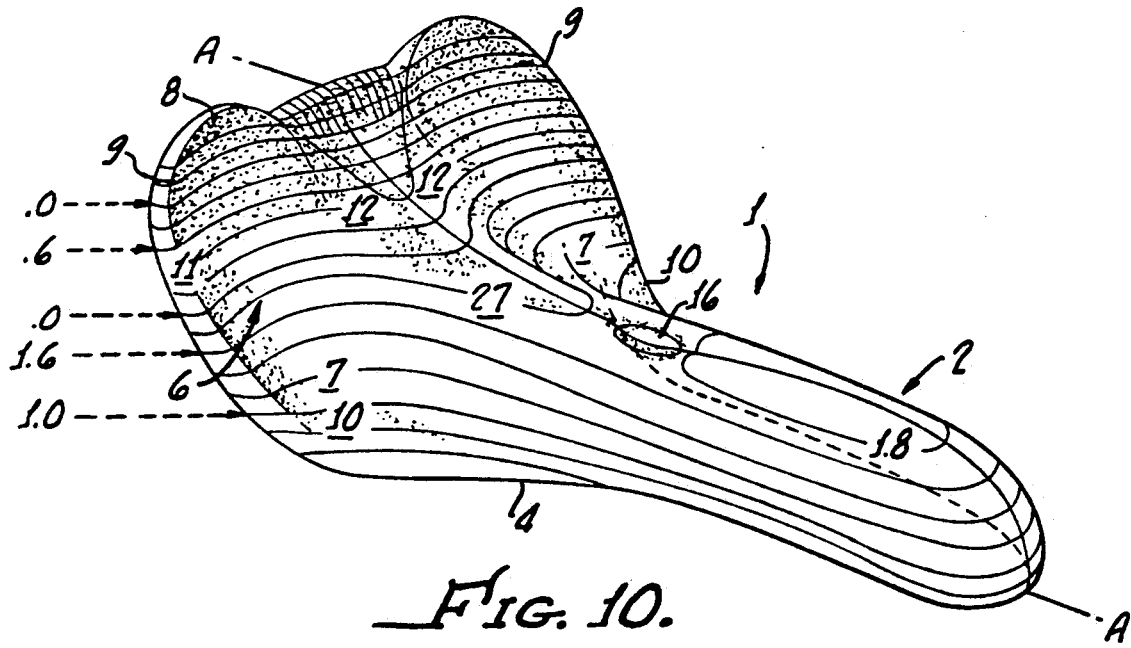
FIG. 10 is a three-quarter front right perspective view of a second embodiment of the saddle of the present invention.

It must also be noted that in the preferred embodiment of this invention, the raised, opposed wedge-like surfaces 29 are transitioned smoothly into the adjacent concavities 6, but, regardless of blending techniques, the main purpose is to differentiate the anatomic support of the coccyx 18 and surrounding tissues and musculature from the support of the rear ischium 22 and its surrounding tissues and musculature. As seen in the lateral view of the pelvis 17 seated upon the SCI saddle in FIG. 7, the close support of the near vertical rise of the rear ischium 22 necessitates the relief and support of the coccyx 18 so that corresponding (near vertical rising) cantle surfaces do not rise directly into and uncomfortably intersect the coccyx 18. Thus, as seen in the preferred embodiment and in FIG. 10, the coccyx support 14 lying medially adjacent to the steeply rising concavities 6 is employed not only to relieve and support the coccyx 18, but also to create a wedge-like projection which uniquely fits and supports the rider's anatomy between the rider's buttocks (located directly below and forward of the coccyx 18), so that a wedge-like barrier to rearward movement of the buttocks on the saddle is created.

The generally triangular (or flared wedge-shaped) coccyx support 14 extends rearwardly from its apex positioned between the concavities 6 where they transition into the pelvic arch ridge 27. It extends rearwardly and laterally outward (from the central axis) to transition smoothly into the upper edge 25 of the cantle ridge 15 formed between the concavity margins 9 and the rear edge 26 (see FIG. 3). The coccyx support area 14 extends forward and makes a smooth transition to the raised pelvic arch ridge, zone 27, which in turn extends forwardly to the perineum/genital groove 16. The coccyx support area 14 is elevated, as defined by opposed, wedge-like side surfaces 29, and inclined at about 30° up from the horizontal upper top surface of the horn, and is preferably slightly dished (concave upwards). It may also be generally flat or the concavity lightly padded.

It must be noted that the top surface 31 of the raised coccyx support 14 is blended into the rear cantle ridge 15 adjacent to the upper edges 25 of the concavities 6 in the preferred embodiment. However, as is noted by an alternate embodiment FIG. 10 of the SCI invention, the rearward perimeter area 8 of the concavities 6 can be extended upwardly to support even more of the near vertical rise of the rear ischium 22 (thus, providing more thrust support), while not raising the coccyx support 14. Thus, the coccyx support 14 would continue to provide anatomic support separate of the rear ischial support surfaces of the concavities 6 in the raised cantle 5. Also in the configuration of FIG. 10, the aft end of the coccyx support 14 may be curved upward so as to match the upward slope of the underside of the coccyx and sacrum.

As best seen in FIGS. 2, 3, 4, and 8 the general dimensions and depth of the concavities 6 are represented by the contour lines, wherein each line corresponds to the designated vertical elevation gain in inches, or in the case of FIG. 1, the axial length (rear to front) along the saddle 1. Generally speaking, the wider the spacing between adjacent contour lines denotes the slight or minimal increase in elevation, while the closer spacing of contour lines indicates a more dramatic increase in elevation gain. The base line is taken to be the very bottom point 13 (See FIG. 3) of the saddle 1.

Figure 3:
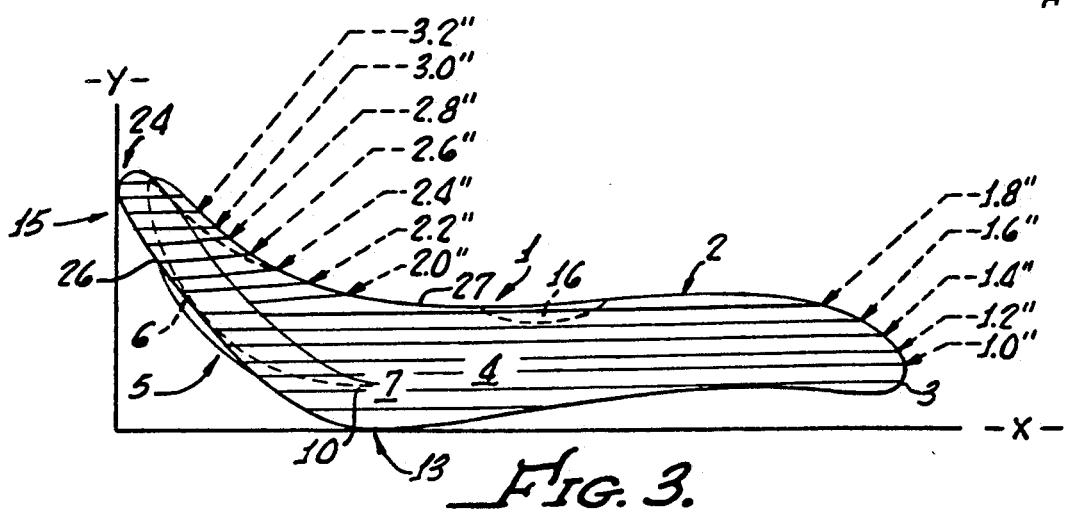
FIG. 3 is a side elevation of the saddle of this invention with elevation contours.
Figure 4:
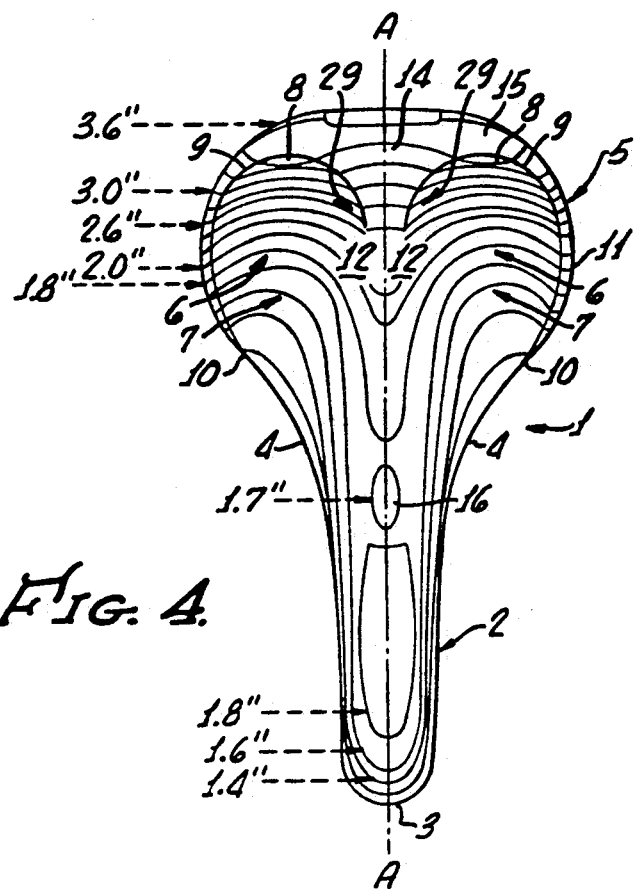
FIG. 4 is a plan view of the saddle of this invention with horizontal contour lines.

The SCI saddle of this invention is characterized by an enlarged, bilaterally symmetrical inclined cantle 5 disposed rearwardly of a generally horizontal saddle horn 2 to which the cantle plane is generally inclined at an angle up from the horizontal in the range of from about 35-55', preferably about 45° (see FIG. 3). The SCI saddle is a single bilaterally symmetrical compound surface with the cantle 5 being flared through transitions 7 into the sides of the horn by concave thigh surfaces 4 and into the top of the horn by a pelvic arch ridge 27. Formed into the cantle are a pair of bilaterally symmetrical inclined dished or concave surfaces 6 which rise in inclination from forward bottom horizontal to rearward top approaching vertical. The forward end of the concave surfaces lie about 3" forward of the rearmost end of the saddle (assuming a rear cantle ridge 15 thickness of about ⅜") and rises from a horizontal base elevation of about 1" to about 3.5" for a total in the range of 2 to 3½", preferably 2½". The inner marginal edges of concavities 6 and side surfaces 29 are spaced from each other along the bilateral longitudinal axis of symmetry A—A (see FIG. 4), by a generally triangular, elevated inclined coccyx support member 14 which flares wider toward the rear, from about ½" at the forward end to about 3" at the rearmost concavity margin. A perineal/genital groove 16 is disposed forward of the pelvic arch ridge 27 in the aftmost ⅜ to ½ of the horn. As contrasted to conventional saddles with little or no rear-end vertical flare, the SCI saddle of this invention has a pronounced, dished, inclined cantle that rises to about two inches above the horn surface, and the top of the dish surface is approximately vertical.

Figure 2:
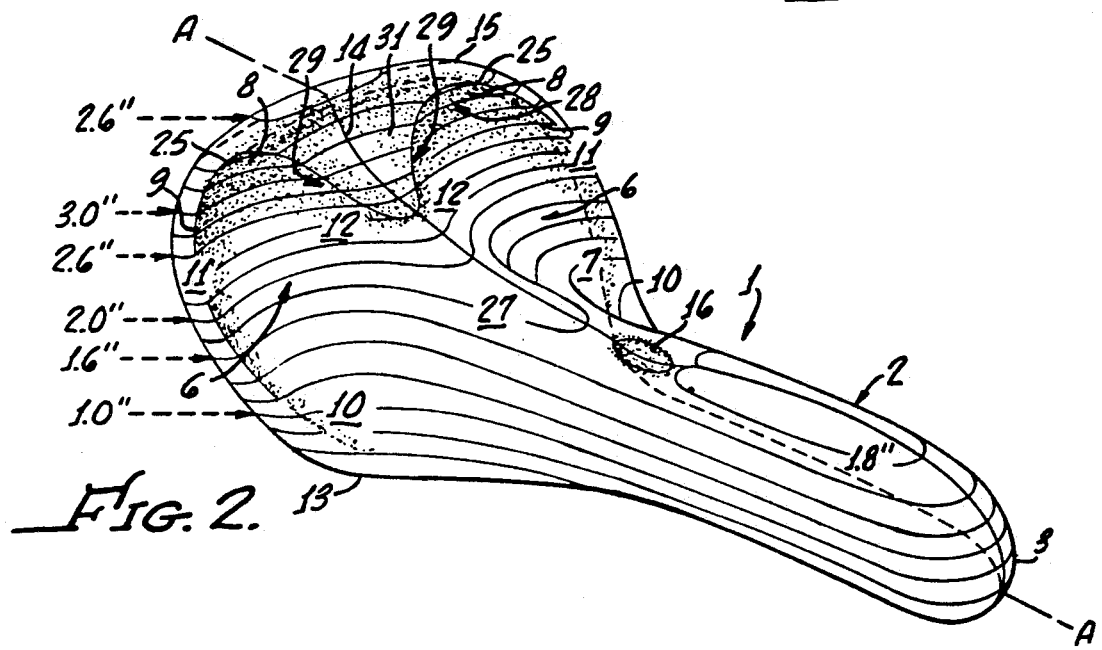
FIG. 2 is a three-quarter front right perspective view of the saddle of this invention showing the elevation contours of the saddle.

In one embodiment mode of the present invention, the concavity cavity 6 begins at a vertical height of approximately 1.0 inches above bottom point 13 (see FIG. 2). The depth of the scoop-like concavity 6 is greatest over the vertical height range of 1.4 to 2.6 inches and then tapers off at the substantially vertical perimeter area 8 which is at a vertical height of approximately 3.5 inches. In other words, the top-most point 24 (see FIG. 3) of the SCI saddle is 1.5-2.5 inches vertically higher than currently available saddles. There is an increase in the effective height of approximately 2.5 inches, where the effective height is defined as the distance from the point of contact of the ischial tuberosities, generally at transition point 7, to the marginal edge 9 bounding the rearward perimeter area 8. The additional height permits an increase of up to 50% more surface contact between the concavities of the SCI saddle and the muscle and tissue portions of the rider's buttocks. The additional surface contact also functions to unweight the anterior portions of the ischial tuberosities and perineum and pubic arch of the rider so that pressure bearing on the bottom portions of the ischial tuberosities and perineum is more evenly redistributed. A more detailed illustration of this and other features will be discussed upon description of FIGS. 5-7 below.

It is understood that the exact dimensions corresponding to the depth, width and height of the dished concavities 6 may vary within the scope of this invention depending on the performance and comfort requirements of different riders and their bicycles. For example, the dimensions of the concavities 6 on a women's model would be shorter longitudinally and wider laterally to compensate for the generally wider skeletal differences in the female pelvis. Additionally, racing saddles would generally tend to have minimal cantle flare, be streamlined side to side to reduce weight, and be somewhat less flexible, while recreational and "cruiser" type versions would have greater lateral flare (width of the cantle) with less concern to save weight.

Figure 8:
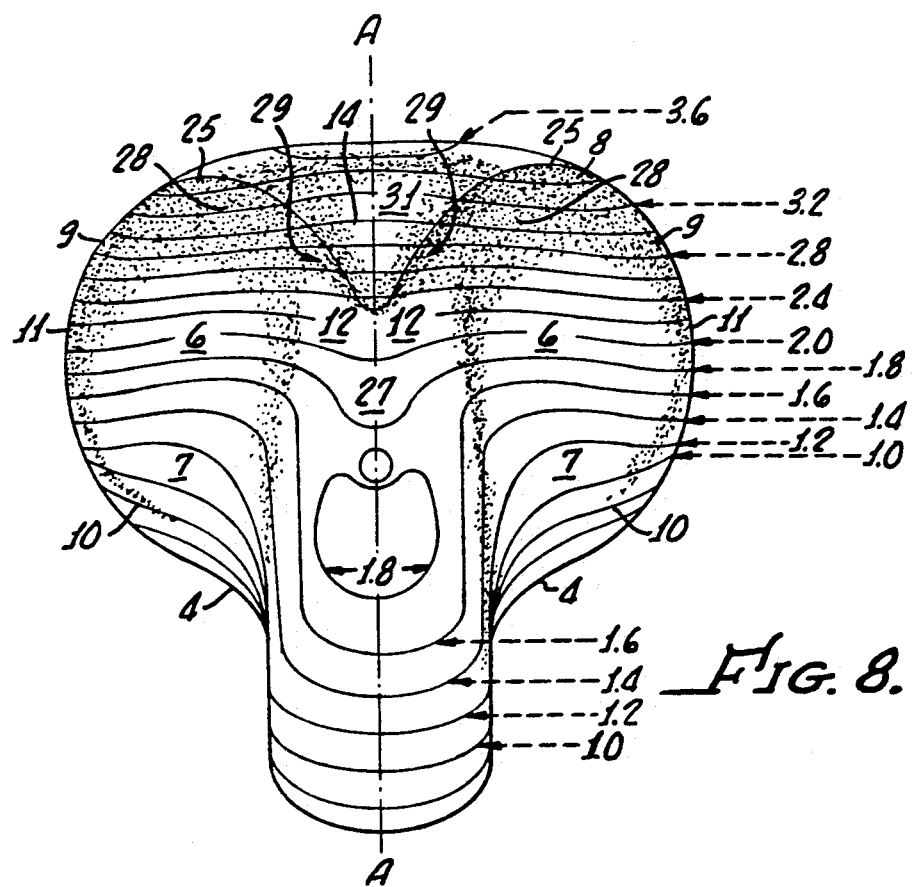
FIG. 8 is a front perspective view of the saddle of this invention with elevation contours.

Referring back to FIGS. 1, 2, 4 and 8, a most important anatomical feature, the coccyx support area 14, is uniquely formed into the flared cantle 5. The coccyx support area 14 is raised having wedge-like side surfaces 29 and lies between the bilateral concavities 6. It is further bounded at the rearward end where the upper coccyx support surface 31 blends into the cantle lip or ridge 15. As noted by the contour lines and as best seen in FIG. 8, the coccyx support area 14 is generally tongue-like, being flared to a wider top at the higher end where it blends into the cantle ridge 15 (except as noted in alternate embodiments such as FIG. 10), and extends downwardly along the longitudinal axis of the saddle 1 towards the pommel 3. The coccyx support area 14, including inclined rearwardly flaring wedge-like side surfaces 29, continually decreases in altitude, width and flare until it reaches the area adjacent the inner terminal points 12 of the outer/upper edge 28 of the coccyx support 14, and then is flared smoothly into the raised pelvic ridge 27 where it fades away. The coccyx support area 14 and wedge-like side surfaces 29 are contoured integral with the adjacent concavities 6 to conformingly relieve and support the rider's coccyx and associated bony projections (including the tissue and musculature between the buttocks located directly below and forward of the coccyx) that come into contact with the flared rear cantle 5 of the saddle 1. It should be understood that the entire saddle surface is a compound surface, and that all the defined zones are smoothly flared into each other via intermediate transition zones.

Another anatomic feature of the SCI saddle, the perineal/genital groove 16 (herein the "P/G groove") which is disposed along the longitudinal axis A—A of the saddle medial of concavely curved bilateral thigh surfaces 4 and generally in the aft ⅓ to ½ of the horn 2. The P/G groove 16 is sized and contoured to provide pressure relief due to the contact of the private parts (perineum and/or genitalia, depending on forward or rearward riding position, respectively) of both male and female cyclists with the SCI saddle. It is worth mentioning that the P/G groove 16 need not be overly deep to provide adequate pressure relief, as is common in other saddle designs, since the better support offered by the rearward concavities 6 and coccyx support area 14 (including the rearwardly flaring, wedge-like side surfaces 29) alleviates a substantial amount of pressure normally caused by conventional saddles on the area of the cyclist's perineum and genital regions.

FIGS. 5-7 show three different positions of a cyclist's pelvis and the areas of contact between the pelvis and the SCI saddle of this invention. In FIG. 5, the pelvis 17 is in a forward cycling position where the cyclist is seated over the center of the SCI saddle. In this position a majority of the load on the saddle due to the cyclist's weight is distributed on the transition zone 7 directly beneath ischial tuberosities 20 and the pubic arch 21, resting on the pelvic arch ridge 27 (see FIG. 2), which spans forward from the transition zone 7 to the P/G groove 16, i.e., the region located approximately 3.5 to 7.5 inches forward of the upper edge 25 of the concavities 6 as seen on FIG. 5. At the same time pelvic load is supported by coccyx support area 14 beneath the coccyx 18.

In FIG. 6, the cyclist has slid backward along the saddle 1 approximately 1 inch. The cyclist's weight is now redistributed more evenly among the pubic arch 21, ischial tuberosities 20, rear ischium 22 and coccyx 18. The rear ischium 22, lesser sciatic notch area 23, and ischial spines 19 are becoming more supported in this position.

Referring now to FIG. 7, the cyclist has assumed a riding position typical for maximum effort and leg extension. The depth of the concavities 6 and wedge-like side surfaces 29, combined with the near vertical surfaces 8 of the concavities 6 provide full, glove-like, support for all the rearwardly disposed bony projections of the pelvis 17, including the ischial spines 19, rear ischium 22, lesser sciatic notch area 23 and the coccyx 18 (including surrounding tissue and musculature). It must be understood that as the rider slides back and forth in the SCI saddle, the shape of the shell compresses the musculature to provide this described support for the bony projections. The SCI saddle of this invention significantly redistributes the loads over substantially the entire surface area of the concavities 6, coccyx support area 14, and wedge-like side surfaces 29, thereby minimizing point loads beneath the ischial tuberosities 20 and relieving pressure on the pubic arch 21.

By providing the added rearward support of the steeply rising concavities 6 and coccyx support 14 in the SCI's raised rear cantle 5, over-rotation of the crests of the ilium and the ischial tuberosities 20 is prevented. This support promotes a better riding posture, where the lower vertebrae assumes less of an arched or hunched-over position. As a result, since the lower vertebrae are no longer subjected to a constant bending motion, less stress and strain is experienced by the nerves and muscles of the lower back. In addition, by restraining excessive pelvic float on the saddle with the wedge-like side surfaces 29 and the bilateral concavities 6 in the inclined extended cantle 5 of the invention, less padding is needed for comfort than is required on conventional saddles. A greater amount of surface area of the rider's buttocks and pelvis is supported by the SCI saddle, thus resulting in less instance of bruising, groin pain, numbness, urethritis, saddle sores, and chafing due to pelvic grind.

The unique contour of the coccyx support area 14 provides pressure relief to the coccyx 18 in substantially all possible seated riding positions. The combination of the raised cantle 5 containing the specially contoured concavities 6 with integral, wedge-like coccyx support area 14 also function to provide a surface of resistance for the rider to maximize his thrust on the pedals. That is, cantle 5 and particularly the wedge-like side surfaces 29 and coccyx support area 14 function as a thrust plate by preventing the rider's pelvis (and associated musculature and tissue) from sliding backward any unwanted distance off the back of the saddle.

Figure 9:
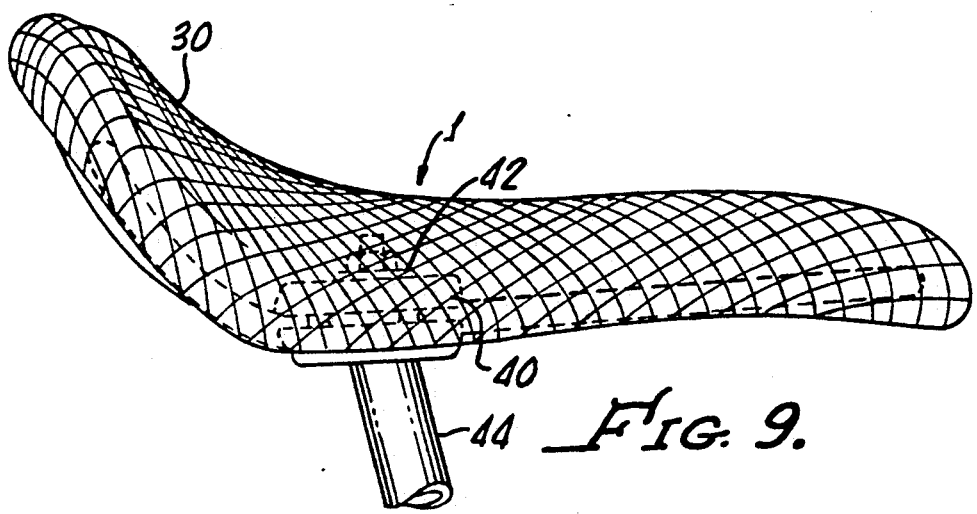
FIG. 9 is a side elevation view of the saddle of the present invention showing a cover stretched thereover.

As is best seen in FIG. 9, a stretchable saddle cover 30 may be stretched over and fitted onto the SCI saddle of this invention. Suitable materials for the saddle cover 30 include lycra, vinyl, or other like elasticized or stretch fabric materials. Alternately, a relatively thin layer of highly compressible foam padding may be spread over the surface of the SCI shell and a relatively non-stretch cover (leather, vinyl, or other suitable fabrics) may be placed over this padding, thus giving the saddle an outward appearance comparable to the outward appearance of the original SCI shell. In other words, the non-stretch cover would more closely follow the contours of the saddle. In addition, a lightly padded material may be used over part or all of the contoured shell of this invention with or without the use of a cover.

The stretchable saddle cover 30 tends to hide the dished surfaces 6 and P/G groove 16 when the rider is not seated on the SCI saddle. However, any of the previous methods of padding or covering the SCI saddle should not impede the function of the saddle to provide full glove-like support of the rider's pelvis and buttocks as it conforms to the saddle contours when subjected to the weight of the seated rider.

Likewise the ischial concavities 6, coccyx support area 14, perineal groove 16, and adjacent wedge-like side surfaces 29, may be filled with a highly compressible foam padding for added comfort to suit the rider's preference. Rails 40 attach to a seat post clamping unit 42 (both shown in phantom) of a seat post 44 in the conventional manner. The saddle rails 40 attach to the SCI saddle by means of plug holes formed into the saddle, much like the way most conventional saddle rails are attached.

It should be understood that various modifications within the scope of this invention can be made by one of ordinary skill in the art without departing from the spirit thereof. For instance, the SCI saddle of this invention may be readily adaptable to recumbent bicycles, tricycles and other forms of human-powered vehicles. I therefore wish my invention to be defined by the scope of the appended claims as broadly as the prior art will permit, and in view of the specification if need be.

What is claimed is:

1. A cycle saddle comprising:

a shell having a single, compound upper seating surface, said seating surface including a forwardly disposed horn member having a generally horizontal upper surface and a rearwardly disposed laterally flaring cantle thrust plate member, the cantle thrust plate member including means, defining a pair of forwardly facing bilateral concavities matching the rise to near vertical portion of the right and left rear ischii of a rider when seated upon said shell, for providing bilateral anatomic support for the ruse to near vertical potion of the right and left ischium including corresponding musculature and tissue, said concavities rising above the generally horizontal upper horn surface;

means defining a forwardly projecting central coccyx support member raised above the generally horizontal upper horn surface, located between said forwardly facing raised bilateral concavities, for supporting the coccyx of the rider and preventing the forward facing concavities from intersecting the coccyx, said central coccyx support member comprises a substantially flat plane having an inclination in the range of about 25 degrees to about 45 degrees relative to said upper horn surface.

2. A cycle saddle as in claim 1 wherein said upper surface of said coccyx support member is slightly concave in a downward direction.

3. A cycle saddle as in claim 2 wherein said cantle member includes means, defining a rearwardly disposed continuous cantle ridge immediately aft of said concave surfaces and a rearward end of said coccyx support area, for providing transverse support to said cantle, the latter being subjected to repeated cycles of great force due to rearward pelvic thrust.

4. A cycle saddle as in claim 3 wherein said cantle member has an angle of inclination of about 45° and said cantle ridge has a top-most point in the range from about 1 inch to about 3 inches above said horizontal upper surface of said horn.

5. Cycle saddle as in claim 4 wherein a forward end of said concavities surfaces are located about 3.5 inches to about 4 inches from a rearward most point of said shell uppermost rearward margins, said concavities are disposed adjacent said cantle ridge spaced about ½ inch from the rearward most point of said saddle; and said concavities have surfaces with a total dish height ranging from about 1" to about 3.5", wherein said dish height is the vertical distance from a forward end to said uppermost rearward margins of said concave surface.

6. A cycle saddle as in claim 5 wherein said shell is fabricated from a material having means, defining the density and thickness thereof, for providing a preselected amount of flexure.

7. A cycle saddle as in claim 6 wherein said shell is fabricated from an injection molded plastic in a monocoque construction.

8. A cycle saddle as in claim 7 further comprising a saddle cover adapted to fit over said cycle saddle, and padding means for providing additional comfort and protection in order to accommodate riders having varying pelvic structures, riding styles and riding positional preferences.

9. A cycle saddle as in claim 8 wherein said cover comprises a stretchable cloth material.

10. A cycle saddle as in claim 9 wherein said cover comprises lycra.

11. A cycle saddle as in claim 9 wherein said cover comprises vinyl.

* * * * *